(12) United States Patent
Sleeman

(10) Patent No.: US 7,191,262 B2
(45) Date of Patent: Mar. 13, 2007

(54) HIGH-THROUGHPUT UART INTERFACES

(75) Inventor: Peter T Sleeman, Hampshire (GB)

(73) Assignee: Elan Digital Systems Limited, Hampshire (GB)

( * ) Notice: Subject to any disclaimer, the term of this patent is extended or adjusted under 35 U.S.C. 154(b) by 237 days.

(21) Appl. No.: 10/678,847

(22) Filed: Oct. 3, 2003

(65) Prior Publication Data
US 2004/0085996 A1 May 6, 2004

(30) Foreign Application Priority Data
Oct. 14, 2002 (GB) ................................. 0223917.6

(51) Int. Cl.
*G06F 13/00* (2006.01)
*G06F 3/00* (2006.01)
*H04B 1/38* (2006.01)

(52) U.S. Cl. .............................. 710/62; 710/8; 710/11; 710/14; 710/38; 710/63; 710/64; 710/71; 710/72; 710/106; 703/25; 375/219; 375/220; 375/222; 455/557; 455/558; 370/278; 370/282; 370/464; 370/465

(58) Field of Classification Search ................ 370/464, 370/465, 106, 261, 278, 282; 710/2, 8, 11, 710/14, 15, 16, 38, 52, 63–64, 71–74; 703/23–25, 703/27; 375/219, 220, 222; 455/557, 558
See application file for complete search history.

(56) References Cited

U.S. PATENT DOCUMENTS

| | | | |
|---|---|---|---|
| 5,408,614 A * | 4/1995 | Thornton et al. .............. 710/21 |
| 5,428,671 A * | 6/1995 | Dykes et al. ............. 379/93.32 |
| 5,537,654 A * | 7/1996 | Bedingfield et al. .......... 710/14 |
| 5,557,751 A | 9/1996 | Banman et al. |
| 5,564,061 A * | 10/1996 | Davies et al. ................. 710/64 |
| 5,604,870 A | 2/1997 | Moss et al. |
| 5,680,553 A * | 10/1997 | Sharma et al. ................. 710/22 |
| 5,884,102 A * | 3/1999 | England et al. ............... 710/62 |
| 6,201,817 B1 * | 3/2001 | Sullivan ..................... 370/463 |
| 6,260,086 B1 | 7/2001 | Butler et al. |
| 6,381,661 B1 | 4/2002 | Messerly et al. |
| 6,434,161 B1 | 8/2002 | Higbee et al. |
| 2002/0184543 A1 | 12/2002 | Wingen |

FOREIGN PATENT DOCUMENTS

| FR | 2 798 797 | 3/2001 |
|---|---|---|
| IE | S75061 | 8/1997 |
| WO | 00/34877 | 6/2000 |

* cited by examiner

OTHER PUBLICATIONS

Texas Instruments, Inc.; TL16PC564B, TL16PC564BLV PCMCIA Universal Asynchronous Receiver Transmitter; SLLS225A—Mar. 1996—Revised Feb. 1998, pp. 1-33.*

*Primary Examiner*—Tanh Q. Nguyen
(74) *Attorney, Agent, or Firm*—Renner, Otto, Boisselle & Sklar, LLP

(57) ABSTRACT

A modified universal asynchronous receiver transmitter (UART) device is provided with an auxiliary high speed parallel channel using supplementary FIFO buffers for the exchange of data. The auxiliary parallel channel is separate from the normal lower speed serial channel which is retained in unmodified form. The retained serial channel provides full compatibility with and support for the National Semiconductor 16550 standard, while the auxiliary parallel channel allows for rapid transfer of large data blocks, such as is needed for a PCMCIA wireless data card for example. The key advantages of this approach lie both in the data transfer speed and in the reduced amount of development time needed to implement a UART interface for communicating between a host computer and a new subsystem. This is because all the UART functions, except large volume data transfer, can be carried out over the standard serial channel using standard device drivers.

17 Claims, 7 Drawing Sheets

HIGH-THROUGHPUT UART INTERFACES

BACKGROUND OF THE INVENTION

The invention relates to universal asynchronous receiver/transmitter (UART) interfaces that are in widespread use for communicating between a host device, such as a computer, and an external subsystem, such as a mobile telephone, plug-in card or another computer.

In order to interface the parallel data bus of a computer to an external subsystem using a serial communication channel, an interface is required to convert parallel bytes into serial bits and serial bits into parallel bytes, depending on the direction of the communication. An industry standard interfacing device for performing this function is the UART. In addition to converting data between parallel byte and serial bit format, UARTs are also responsible for managing other aspects of asynchronous data transfer. For example, UARTs set the timing of bit transfer, perform parity checking (if used), add the start and stop control signals to a transmitted data stream and also strip them from a received data stream. One common family of UART devices is those conformant to the standards set by the National Semiconductor 16550 chip.

Corresponding synchronous devices, referred to as USARTs (Universal Synchronous Receiver/Transmitters) also exist.

FIG. 1 illustrates a standard 16550 UART connected between a host 10 and subsystem 50 to provide an asynchronous communications capability. The 16550-type UART 20 is shown interfaced on one side to the host 10 via a data bus 12 and on the other side to the subsystem 50 via a bidirectional serial communication channel 52 comprising a transmission line TX and a receiver line RX. The UART 20 includes a register set 22 made up of a number of eight-bit registers. Register THR is a transmitter holding register, register RBR is a receiver buffer register, register IER is an interrupt enable register, register IIR/FCR is an interrupt identification/first-in-first-out (FIFO) control register, register LCR is a line control register, register MCR is a modem control register, register LSR is a line status register, register MSR is a modem status register, register SCR is a scratch register, register DLL is a least significant bits division latch register and register DLH is a most-significant bits division latch register.

The UART 20 includes a 16-byte transmit FIFO buffer 24 paired with a parallel-to-serial (P-S) converter 25, and a 16-byte receive FIFO buffer 26 paired with a serial-to-parallel (S-P) converter 27. The UART 20 also includes interrupt request (IRQ) logic 13 and a baud-rate generator (BRG) 8. The main connections to and from the UART 20 are indicated in the figure and include a transmission line TX, a receiver line RX, a modem control output (MCO) 6, a modem status input (MSI) 4, an oscillator crystal input (OSC) 2, an interrupt request output (IRQ) 14 and a data bus 12 for communicating with the host. Industry standard addresses are associated with each of the registers such that the operating system of the host can access (i.e. read from or write to) the registers as required via the data bus 12.

To send a byte of data from the host to the subsystem along the serial transmission line TX, the byte of data is first written to the THR register via the data bus 12. The UART transfers the byte of data into the 16-byte transmit FIFO buffer 24 for temporary storage. The purpose of the transmit FIFO buffer 24 is to allow the host computer to pass several bytes of data for transmission to the UART at a rate which is faster than the UART can process and send the data along the output serial communication channel. The byte of data (or the oldest byte of data resident in the transmit FIFO buffer 24 if it is not otherwise empty) is then passed to the parallel-to-serial converter 25. The parallel-to-serial converter 25 functions to generate a start signal, serialize the byte into eight sequential bits and generate a stop signal and supply these data bits at an agreed bit rate to the transmission line TX.

To receive a byte of data from the subsystem along the serial receiver line RX, the UART is first alerted to incoming data by a start signal supplied by the subsystem. This is detected by the serial-to-parallel converter 27 which monitors the receiver line RX awaiting the arrival of start signals indicating that the subsystem is about to send data. When a start signal is detected, the serial-to-parallel converter 27 samples the receiver line RX at a previously agreed bit-rate to determine eight sequential bits of data sent by the subsystem. A stop signal from the subsystem confirms the end of data transfer. The data bits are parallelized to form a byte which is then written to the 16-byte receive FIFO buffer 26. The purpose of the receive FIFO buffer 26 is to allow several bytes of data to be received by the host without an interrupt being generated for each byte. Several received bytes can be deposited into the receive FIFO buffer 26 and transferred to the host on a single interrupt. On interrupt, each received byte is written from the receive FIFO buffer 26 into the RBR register in turn. The host retrieves the data byte via the data bus 12.

The functions of the remaining registers and the other components shown in the figure are not discussed further for brevity. However, these features are standard and well known.

In summary, UART interface devices act as communications elements, passing data between parties to a data transfer as serial bit-streams. Due to a wide adoption of the 16550-type UART device (virtually every desktop Personal Computer (PC) of the "IBM Compatible" type contains at least one such UART), most computer operating systems include device drivers which offer generic support for this type of UART. Subsystems which adopt the 16550-type UART register set and conform to the "industry standard" 16550-type UART functionality can expect support on a wide range of computer platforms, including Personal Digital Assistant (PDA) platforms and miniature hand-held PCs.

The standard 16550-type UART can support serial data transfer rates of up to 115,200 bits-per-second (bps). The 16-byte transmit and receive FIFO buffers allow the use of such bit rates with continuous flows of data by providing a temporary store for data before being recovered by the host computer, or serialized by the UART's parallel-to-serial converter, as discussed above. To improve the performance capabilities of 16550-type UARTs it has been proposed to use larger transmit and receive FIFO buffers, for example up to 128-byte FIFO buffers. These "FIFO-enhanced" 16550-type UARTs devices offer the advantage that more data can be stored on a temporary basis which in-turn allows a greater fluctuation in device driver response time which can be accommodated without data corruption. In this context, the driver response time, or latency, is defined as the period between "bursts" of activity. These bursts are normally triggered by a hardware interrupt from the UART to request service from the driver in order to keep the transmit FIFO buffer filled before it under-runs, or to empty the receive FIFO buffer before it over-runs. The latter is the most serious condition as it will result in data loss rather than degraded performance.

Increasing the size of the transmit and receive FIFO buffers in a 16550-type UART improves performance, but the underlying transfer mechanism remains that of an asynchronous serial bit-stream. This transfer mechanism inherently imposes speed limitations, because of the need to serialize the data and the inefficient use of available bandwidth. An additional problem with increasing the size of the internal transmit and receive FIFO buffers is that they use a large amount of silicon area. They also require modification of existing device drivers since these are conventionally written for 16-bytes transmit and receive FIFO buffers.

The basic 16550-type UART therefore offers a simple, convenient and well supported method of data transfer between a host computer and its subsystems, but one which imposes limitations on the transfer of large blocks of data or for continuous data transfer.

Some specific examples of improvements on the basic 16550-type UART are now briefly summarized.

U.S. Pat. No. 6,434,161 [ref. 1] describes an "emulated UART" in which the regular serial communication channel is effectively replaced with a parallel communication channel by allowing bytes to be transferred between a host computer and a subsystem using a Direct Memory Access (DMA) method. The emulated UART can operate faster because there is no need to serialize or de-serialize the data. The data transfer is done in parallel without any temporary buffering of the bytes.

U.S. Pat. No. 6,381,661 [ref. 2] describes a UART connected to a additional device, termed a UDIF, that takes data from the UART serial communication channel and re-buffers it into a parallel format so that it can be more efficiently accessed by a subsystem.

U.S. Pat. No. 6,260,086 [ref. 3] describes an improved method for loading multiple data words into, or from, the internal transmit and receive FIFO buffers in a UART. The method employs more efficient microprocessor instructions which have explicit addresses aliased back to a single address, i.e. the data address of the transmit or receive FIFO buffers.

U.S. Pat. No. 6,201,817 [ref. 4] describes a command processor for decoding data streams flowing serially in and out of a UART. The decoder reduces the processing overhead of a subsystem processor when determining whether special characters or sequences of characters are present in the data.

U.S. Pat. No. 5,557,751 [ref. 5] describes a system in which serial data flow is directed to the normal internal UART registers, and then buffered by additional FIFO buffers. The additional FIFO buffers are larger than the internal transmit and receive FIFO buffers, and can be accessed by the subsystem in a manner appropriate to its local bus.

The prior art approaches can be classified into two groups.

The first approach [e.g. refs. 3, 4, 5] provides improvements on how data is handled at the receiver or sender at either end of the serial channel. This approach can provide significant improvements, but data transfer rates are ultimately limited by the serial channel.

The second approach [e.g. refs. 1, 2] overcomes the speed limitations of the serial channel by replacing it with a parallel channel. Higher data transfer rates are thus achieved. However, compatibility with the 16550-type UART standard is lost. Loss of this compatibility creates a great deal of additional development work when implementing a UART interface for a new subsystem. For example, extensive rewriting of standard device drivers is often required.

SUMMARY OF THE INVENTION

As an alternative to the standard approach of increasing the internal FIFO size of the 16550-type UART to improve data transfer rates over the serial communication channel, an architecture is proposed that retains the serial communication channel and adds to it a separate auxiliary parallel data channel that can be accessed in parallel by both the host and the subsystem. This design can be implemented in such a way that the conventional UART serial operation is left unchanged so allowing regular serial communications to and from the subsystem for low speed data traffic (e.g. for command and control usage). High speed data traffic is performed using the auxiliary parallel data channel, thereby bypassing the bottleneck of the serial data channel. This adaptation can be applied by modifying the standard 16550 architecture so as to retain the benefits of a regular 16550-type UART and combine these with an auxiliary parallel data channel that can be used in a fully parallel fashion to improve data throughput.

Therefore, according to a first aspect of the invention there is provided an interface device for enabling communications between a host and a subsystem, comprising: (a) a register set comprising a plurality of registers configurable to control host-subsystem communications according to a UART standard; (b) a host interface configurable to establish data communications with the host; (c) a serial interface configurable to establish a bi-directional serial data communication channel to the subsystem under control of the register set; and (c) a parallel interface configurable to establish an auxiliary parallel data communication channel to the subsystem operable in conjunction with the serial data communication channel.

By providing both serial and parallel data communication channels in this way, the device allows for standard serial communication between the host and the subsystem and thus maintains full backward compatibility with existing hardware and device drivers. As a result, a high-throughput host-subsystem interface can be designed for any particular subsystem without having to extensively rewrite the device drivers and change the interface hardware. Existing well proven device drivers and hardware for the serial channel can be retained, and the design work for any new interface is confined to providing additional software and hardware support for the transmission of larger amounts of data over the auxiliary parallel channel.

With this design, the lower speed serial channel can be used independently of the auxiliary parallel channel, so allowing concurrent operations and greater flexibility.

The parallel interface preferably also operates under control of the register set. Allowing the data transfer to be controlled through the UART conformant register set, minimizes the modifications that need to be made to existing device drivers and hardware when implementing any particular host-subsystem interface.

The parallel data communication channel preferably uses one or more supplementary data buffers, typically FIFO buffers, for writing and/or reading data to and/or from the subsystem via the parallel interface. (These supplementary data buffers provided for the auxiliary parallel data communication channel are not to be confused with the internal 16-byte (or larger) FIFO data buffers that form part of the serial channel in most, if not all, usual UART implementations, as described in the introduction.)

By including supplementary data buffers, multiple bytes of data may be transferred through the parallel communication channel before servicing by an operating system is required. This allows multiple bytes of data to be transferred on a single interrupt, this further increasing the data throughput of the device, and ensures that data transfer along the parallel communication channel has little or no impact on data transfer along the serial data communication channel.

Preferred implementations of the invention map each of the data buffers to one or more registers of the UART conformant register set. This allows for simple control of the parallel data communication channel by the host, since accesses to the relevant mapped registers will cause read or write accesses to the data buffer. Control and status lines are preferably connected between each data buffer and the relevant mapped registers to communicate control and status signals to and from each data buffer. Additional control and status lines may be provided to assist communication with the host over the parallel data communication channel. These lines will be connected between each data buffer and the parallel interface to communicate control and status signals to and from each data buffer.

Although the embodiments of the invention described below use FIFO data buffers, the invention could in principle be implemented with other kinds of data buffers. Any type of memory device that allows sequential access would be suitable. Sequential access means that the accesses have no address as-such. For example, DRAM or SRAM with glue logic to make it look FIFO like could be used.

The main embodiment of the invention described below, the UART standard conformed to is the 16550 standard. However, in principle the invention could be applied to an interface following any UART standard. It will also be understood that references to UART standards throughout this document should be interpreted to include comparable USART standards.

According to a second aspect of the invention there is provided a card comprising an interface device according to the first aspect of the invention integrated with a subsystem. The card may be a PCMCIA Card, Cardbus Card, Compact Flash Card, for example. The subsystem may include a wireless interface for communicating with a third party data transceiver.

According to a third aspect of the invention there is provided a system comprising a host, a subsystem and an interface device according to the first aspect of the invention. In some applications, the serial data communication channel and the auxiliary parallel data communication channel will include wireless portions (e.g. a wireless card plugged into a host PC for communicating with a nearby PDA or mobile telephone, or a remote telephone network), whereas in other applications, they will be made exclusively of fixed links (e.g. a host PC connected to another PC acting as the subsystem over a coaxial cable or optical fiber network link).

According to a fourth aspect of the invention there is provided a method of communicating data between a host and a subsystem, comprising: (a) establishing a bidirectional serial data communication link with the subsystem under control of a register set conforming to a UART standard; (b) establishing an auxiliary parallel data communication link with the subsystem; and (c) transferring data over the auxiliary parallel data communication link to bypass the serial data communication link. The parallel data communication link is preferably also established under control of the register set.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 2:
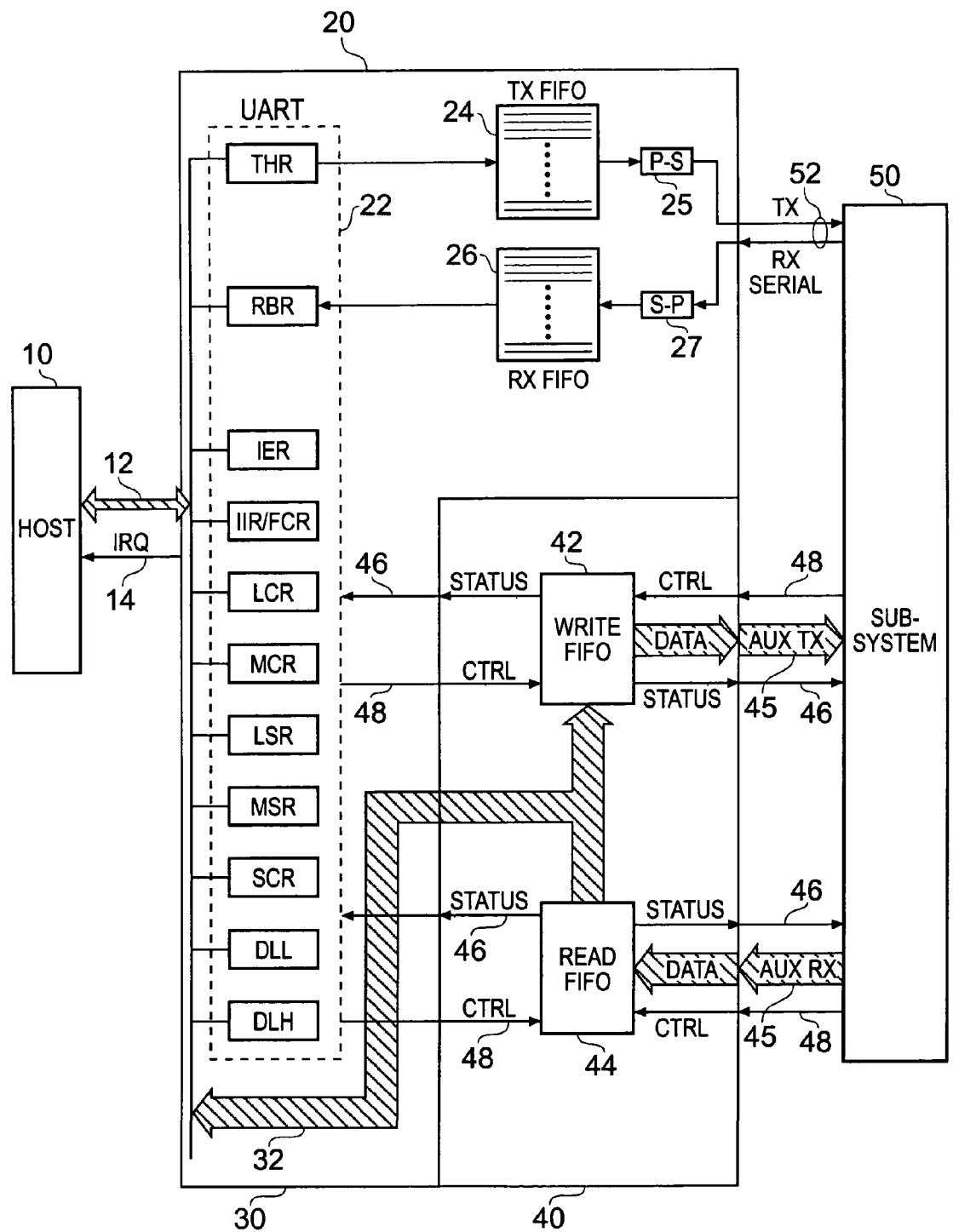
FIG. 2 shows a UART device connected between a host computer and subsystem according to an embodiment of the invention, with an auxiliary parallel data communication channel using supplementary FIFO data buffers being provided in addition to a standard serial data communication channel.

FIG. 2 is a block diagram of an embodiment of the invention. A host 10 is connected to a subsystem 50 by a UART device 20, referred to simply as the UART in the following. The host 10 may be a computer or other intelligent device. The subsystem 50 may be any device with which the host 10 needs to communicate with, such as a computer, a mobile telephone, PDA or a plug-in card of any of these. The host 10 is connected to the UART 20 by a computer interface having a data bus 12 and an interrupt line IRQ 14. The computer interface will conform to some standard protocol, such as PCI or PCMCIA or Compact Flash. The UART 20 is connected to the subsystem 50 by a standard 16550-compatible serial channel 52 comprising a single transmission line TX and single receiver line RX. In addition to the standard serial channel 52, the UART 20 is connected to the subsystem 50 by a parallel channel 54, referred to as an auxiliary channel in the following in contrast to the standard channel. The serial and parallel channels may be fixed links (e.g. electrical or optical fiber), or wireless links (e.g. radio frequency or free space optical), or a combination of fixed link and wireless link portions.

Figure 1:
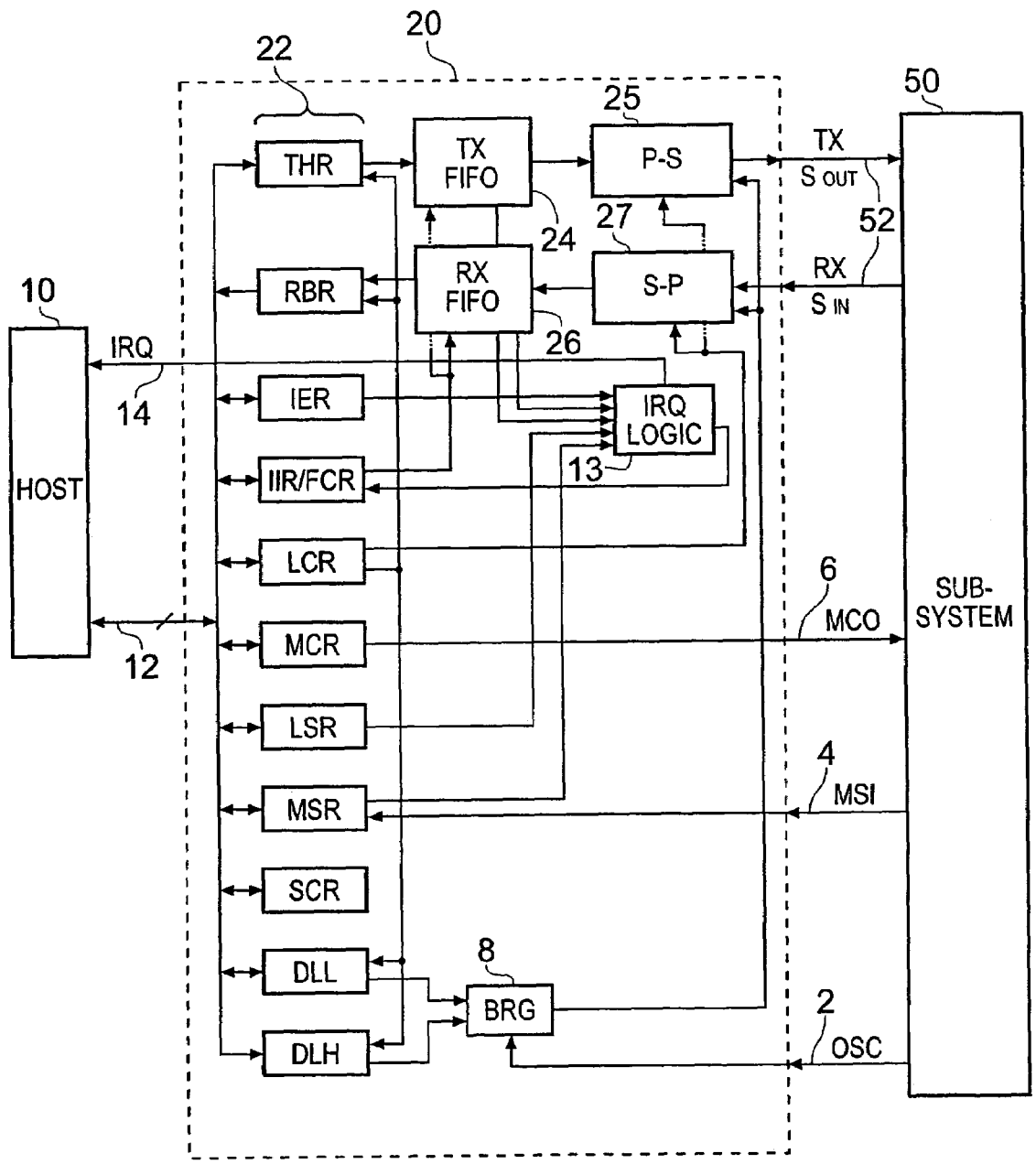
FIG. 1 shows a UART device connected between a host computer and subsystem according to the prior art.

The UART 20 comprises a standard 16550-compatible part 30 and a non-standard part 40 for supporting the auxiliary channel. The standard part 30 of the UART is as described more fully in the introduction with reference to FIG. 1. In FIG. 2, only selected components of relevance are shown. The register set 22 is shown, as are the internal FIFO data buffers 24 and 26 for transmission and receiving data from the standard serial channel. The internal FIFO data buffers 24 and 26, FIFOs for short, are connected to transmit and receive data through P-S and S-P converters 25 and 27 respectively, as described in the introduction. The non-standard part of the UART 30 comprises FIFO buffers 42 and 44 for write and read respectively, which are referred to as supplementary FIFOs in the following by contrast to the FIFOs 24 and 26 used to support the standard serial communication, which are referred to as internal FIFOs, since they are part of the conventional UART. Status lines 46 are provided to convey status signals from the supplementary FIFOs 42 and 44 to the UART register set 22 and the subsystem 50, in order to indicate the data level in the supplementary FIFOs 42 and 44 (e.g. empty, half-full, full). Control lines 48 are provided to convey control signals to allow data to be loaded into and unloaded from the supplementary FIFOs 42 and 44. A data bus 32 connects between the standard part of the UART 30 and the supplementary FIFOs 42 and 44 for the parallel exchange of the data bytes. A bus connection from the read to write FIFO is shown. This is used to get the data to/from the FIFO and from/to the host. FIFOs have 2 ports and this bus is shared for efficiency of pins.

The supplementary FIFOs and associated hardware may be part of the same integrated circuit as the conventional UART components, or may be external to the conventional UART components, i.e. off-chip.

To ensure that the modified UART behaves as a conventional 16550-type UART, the scratch register (SCR) of the UART register set 22 is used as a "shadow" for the supplementary FIFOs. The SCR was defined in the original 16550 as an 8-bit register that could be read or written by the host computer to serve as 8-bits of general purpose storage (commonly known as a scratch-pad register). When the first 16550 devices were conceived and data storage was a precious commodity, 8-bits of memory were useful to hold temporary variables. However, the SCR has never really served any useful purpose and has no effect on the data communications operation of the UART. This said, some device drivers use a simple write-read test on the SCR to detect that the UART is accessible. This technique was used as a "UART detection test" in the period before true Plug-n-Play detection and configuration methods emerged, and still lives on today in some operating system device drivers. It is therefore advantageous to keep the SCR as a read-write register under default conditions as this will allow standard drivers to load and start correctly believing that the SCR is working as normal.

Figure 3:
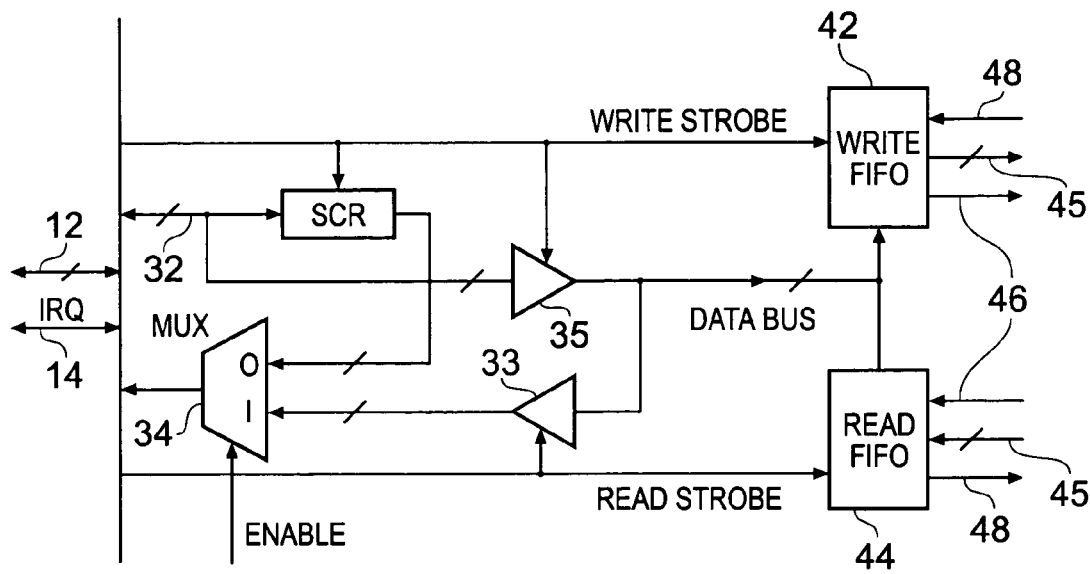
FIG. 3 shows how the supplementary FIFO data buffers are mapped to the SCR UART register.

FIG. 3 shows how the SCR is substituted by the supplementary FIFOs 42 and 44 when a control signal ENABLE is activated. Parallel connections are indicated with an oblique stroke across the relevant connection. The host and subsystem connections 12, 14, 45, 46, 48 described with reference to FIG. 2 above are also shown. The control signal ENABLE may originate from the standard part of the UART, for example it could be generated under a specific set of UART configuration conditions, as manifested by the register contents. Alternatively, this control signal may come from an external source, for example the subsystem 50. Moreover, a scheme where the supplementary FIFOs are always enabled would be appropriate for some applications in which case the control line could be omitted.

It would also be possible to use one register to shadow the read FIFO and a different register to shadow the write FIFO. Moreover, there could be just one FIFO, or two or more FIFOs which may all be for transmit or receive or any mixture depending on the application.

The overall effect of the scheme illustrated in the figure is that an access to the SCR will actually cause an access to the relevant supplementary FIFO 42 or 44 instead. A read of the SCR will collect one byte from the read FIFO 44 using the data bus 32 and by way of an I/O buffer 33 and a bus multiplexer 34. A write to the SCR will deposit one byte into the write FIFO 42 using the data bus 32 and by way of an I/O buffer 35.

When the supplementary FIFOs are enabled, appropriate FIFO read and write strobes are generated that would normally have served as the read and write strobes for the SCR. Instead these are now routed to the FIFOs for data control.

Using this configuration allows a standard UART device driver to co-exist with a high-speed parallel device driver exchanging data via the supplementary FIFOs. The supplementary FIFOs can be made arbitrarily large and can be implemented in any way the system designer sees fit. For example, they could be separate FIFO devices on the circuit board or could be part of a general purpose logic device like a Field Programmable Gate Array (FPGA) or an Application Specific Integrated Circuit (ASIC)). As already mentioned, there is also the possibility of integrating the supplementary FIFOs in with the modified UART in a single chip solution.

In a preferred embodiment of the support software, a standard 16550-type UART device driver is modified to also include features to support the supplementary FIFOs. In another embodiment, separate drivers for each function are used allowing independent operation of the serial channel as one logical device, and the auxiliary channel as another logical device. The choice will depend on the operating system's restrictions and capabilities coupled with the target application's requirements.

It should also be noted that while the SCR register has been chosen in the above description to act as the shadow register, other registers could also be used so long as the shadowing operation does not hinder the normal UART functions. For example, in another embodiment, an alternative UART register could be chosen (e.g. the IER) that only switches to supplementary FIFO accesses when some other UART register or registers is/are set to a specific value or values. It should be understood that a number of methods of shadowing the supplementary FIFOs could be found. The SCR used in the main embodiment is a natural choice because of its passive nature.

The manner in which the data level in the supplementary FIFOs is monitored is now described. Various status signals 46 are fed back from the supplementary FIFOs 42 and 44 to the standard part of the UART 30 for this purpose. In the preferred embodiment, these status signal lines connect to one or several of the modem status lines, such as CTS, DSR, RI, DCD which feed into the MSR (modem status register).

Figure 4:
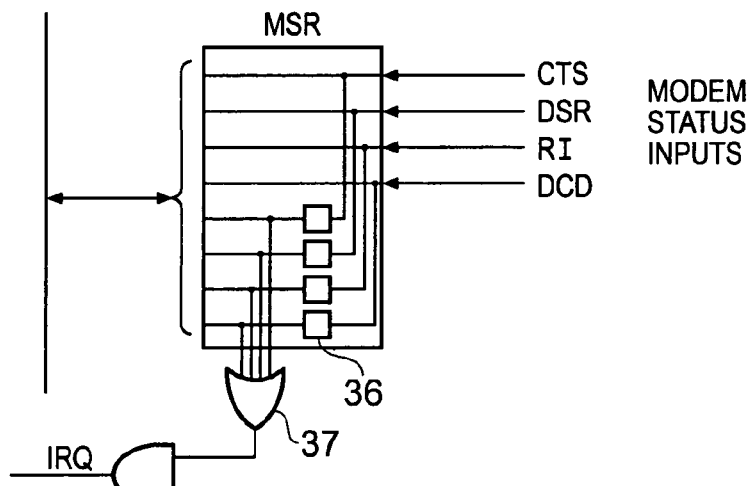
FIG. 4 shows details of the handling of status signals from the supplementary FIFO data buffers.

FIG. 4 shows how these general purpose inputs can be connected to the MSR. These status signals form part of an industry standard 16550-type UART. The internal status of each signal can be read by the host 10 by reading the bits of the MSR as status bits. Moreover, changes of state of these status bits can also be obtained using what is sometimes referred to as modem status delta bits. The delta bits are generated using flip flops 36 arranged in series with the modem status bits to detect transitions in the bit status. The outputs of these flip flops 36 are logically ORed with an OR gate 37 so that any one can cause an interrupt. The interrupt from the delta bits is gated by an AND gate 38 to allow it to be used or not, as required (i.e. a mask bit). A hardware interrupt can thus be generated and sent to the host computer 10 on the interrupt line 14.

The control signals 48 (see FIG. 2) used to read or write data from or to the supplementary FIFOs are implemented as dedicated signals in the preferred embodiment. However, other embodiments may instead re-use existing standard UART lines to carry the control signals.

Figure 5:
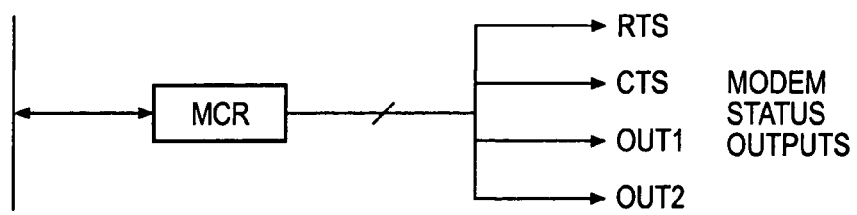
FIG. 5 shows details of the handling of control signals for the supplementary FIFO data buffers.

FIG. 5 shows an alternative in which the control signals are carried by modem control lines, e.g. RTS, CTS, OUT1 or OUT2, that change function to become read and write strobes when the supplementary FIFOs are enabled. These modem control outputs are shown in the figure as outputs from the UART's modem control register MCR. It should be understood that there are many ways to generate these control signals, either by dedicated means or by reusing existing UART signal lines.

It is advantageous from a system design perspective to make the standard part of the UART 30 and the non-standard part 40, including the supplementary FIFOs and associated components, operate as a unitary element in the circuit so as not to require any extra "glue" logic or decoding logic. Adding such extra logic has a penalty for both cost and for circuit board area usage. In this embodiment, a unitary element is provided by using the modem status lines, that report through the MSR as just described, in order to notify the host and device driver when the supplementary FIFO data levels have reached some predefined limit. Industry standard FIFO devices, such as the 720x family, include status flags that show when the FIFO is empty, half full and full.

Figure 6:
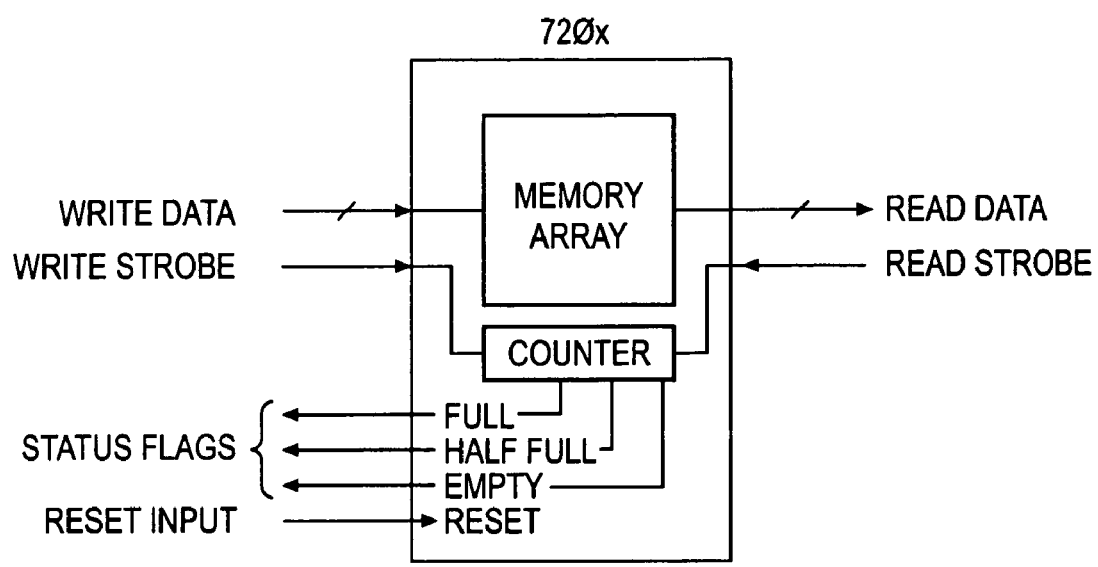
FIG. 6 is a simplified schematic drawing of a standard 720x FIFO data buffer.

FIG. 6 shows a typical FIFO device for reference. It should be stressed that any type of FIFO or similar data memory could be used, so long as it can generate appropriate status signals either directly from the memory or derived from some supplementary logic circuit.

In another embodiment of the invention, the auxiliary data channel could exchange data between the host computer and the subsystem by means of direct memory access (DMA) processes, triggered in response to the same FIFO status flags as described above. This would have the advantage of using semi-autonomous bus data exchanges, so reducing the overhead of the device driver or the subsystem needing to poll or to respond to interrupts.

The control and status lines described are sometimes used as "hardware handshake" signals between the sub-system and the host computer to control the flow of serial data. In another possible embodiment, the supplementary FIFO status signals could be accessible to the host computer via another shadowed UART register. In such a scheme, the action of enabling the supplementary FIFOs could also serve to change the function of some other bits in one or more of the UARTs internal registers. This would have the advantage of leaving the control and status lines available for use in the conventional way.

Figure 7:
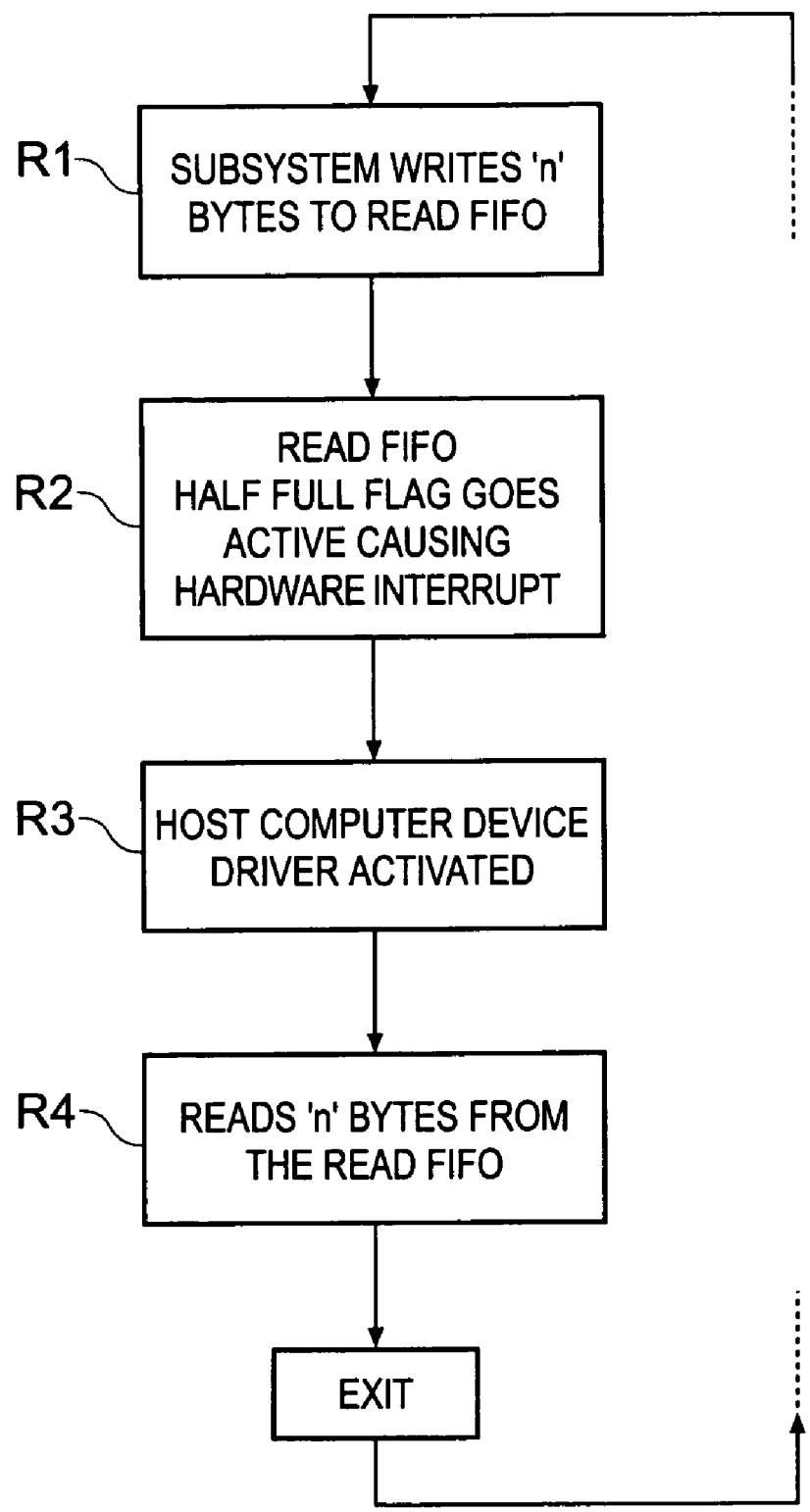
FIG. 7 is a flow diagram showing data transfer from subsystem to host.

FIG. 7 is a flow diagram showing continuous read operations using the embodiment of FIG. 2 in which the data flow is from the subsystem 50 to the host 10.

In Step R1, the subsystem 50 writes data via the data bus 45 into the supplementary read FIFO 44.

In Step R2, once the FIFO 44 becomes half full, triggering the status flag 46 to go active, the UART 20 creates a hardware interrupt 14 by virtue of the modem delta bits and hardware interrupt shown in FIG. 4.

In Step R3, the host 10 then calls the device driver, which after some variable period dictated by the system (the latency period), will inspect the UART registers to establish why the interrupt occurred.

In Step R4, on detecting that a certain modem delta bit was the cause, the driver can proceed to read "n" bytes of data from the supplementary read FIFO. This interrupt cause detection is a standard operation for a 16550 UART. The value "n" would be set as appropriate for the specific subsystem design to be equal to half the FIFO's capacity.

While the device driver is busy emptying the supplementary read FIFO 44, the subsystem 50 continues to deposit more bytes of data into the supplementary read FIFO 44 on its other port, demonstrating that this system is capable of dealing with continuous streams of data. (FIFOs have two data ports, one for data in and one for data out.) After reading and storing "n" bytes, the device driver exits ready for the next interrupt as the supplementary read FIFO crosses the half-full boundary again.

In this example, use is made of the half-full flag. It should be understood that any other viable means of detecting the data level inside the supplementary FIFO would work equally well so long as the device driver and subsystem both "know" what this level is. The agreed level could be set at the design stage, or could be set dynamically at run time by passing a message over the serial channel from the host to the subsystem or vice-versa.

Figure 8:
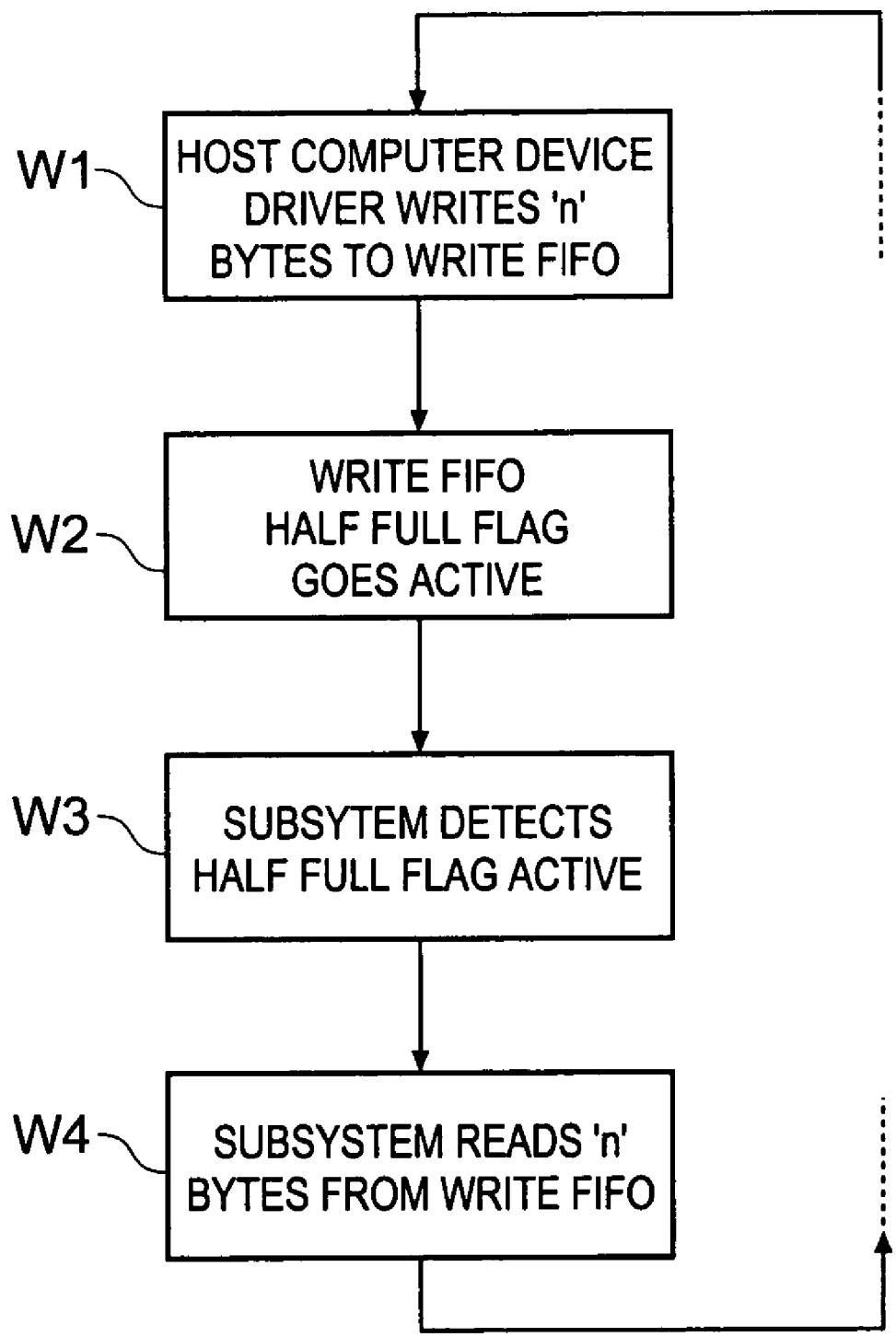
FIG. 8 is a flow diagram showing data transfer from host to subsystem.

FIG. 8 is a flow diagram showing continuous write operations using the embodiment of FIG. 2 in which the data flow is from the host 10 to the subsystem 50.

In Step W1, the host device driver writes data via the data bus 32 into the supplementary write FIFO 42.

In Step W2, once the supplementary write FIFO 42 becomes half full, triggering the status flag 46 on the subsystem side of the supplementary write FIFO 42 to go active, In Step W3, the status flag is detected by the subsystem. This may be by polling the status line or by interrupt driven means.

In Step W4, the subsystem 50 will, after some variable period dictated by the subsystem (the latency period), act to read "n" bytes of data from the supplementary write FIFO 42 over the data bus 45. The value "n" would be set as appropriate for the specific subsystem design to be equal to half the supplementary write FIFO's capacity.

While the subsystem is busy emptying the supplementary write FIFO 42, the device driver continues to deposit more bytes of data into the supplementary write FIFO 42 on its other port demonstrating that this system is capable of dealing with continuous streams of data. After reading and storing "n" bytes, the subsystem 50 waits, ready for the next status indication that the supplementary write FIFO 42 has crossed the half-full boundary again. In this example, use is made of the half-full flag. It should also be understood that other means of detecting the data level inside the supplementary write FIFO 42 would work equally well. Similar comments apply to those made above for the supplementary read FIFO 44.

The above read and write examples relate to continuous data flow. However, it should be understood that a discontinuous data flow would work equally well, with the host and subsystem exchanging fixed size blocks of data with arbitrary time delays between each block. A similar scheme as described above, using status signals to trigger data collection in each direction, would use these status signals as a "data block available" indication, i.e. an indication that a precise amount of data are ready, rather than a progress indication as the FIFO fills up.

To summarize, a key advantage to the system designer of using the proposed approach lies not in the accomplishment of high data transfer speeds as such, but in the reduced amount of development time needed to implement a UART interface for communicating between a host computer and a new subsystem. This is because, all the UART functions, except large volume data transfer, can be carried out over the retained standard serial channel using standard device drivers. This means that standard initialization, command and control software can be retained and the bespoke element of the development is confined to creation of appropriate hardware, firmware and/or software to deal with the transfer of larger amounts of data, e.g. certain types of data blocks, through the auxiliary parallel data channel.

Another important advantage lies in the ease of use of the supplementary FIFOs which follows from their addressability via a shadow register of the existing 16550 register set. Although FIFOs for parallel data transfer could in principle be connected directly to the host computer bus, this would require a considerable amount of design effort from the design engineer in order to make sure that the FIFOs were correctly addressable and did not interfere with the normal operation of the bus or the UART. This in turn means specialized knowledge of the busses electrical characteristics, its protocol, and the resource allocation implications of trying to add extra registers into the memory or I/O map of the device (the device being "the product", e.g. a PCMCIA card). Some or all of these problems may require substantial effort to solve and further substantial effort to check cross-platform compatibility. For example, the solution could work in a laptop computer but not a hand-held PC or PDA, or may not work in some operating systems. By making the supplementary FIFOs addressable by mapping them to a shadow register, these problem are avoided. The UART appears, from a resource point-of-view, exactly like a normal 16550 UART with no extra glue logic needed to be able to use the extra supplementary FIFOs. Clearly this is a major advantage and again improves time-to-market and the chances of getting a right-first-time design into production.

APPLICATIONS

The present invention may find application in areas such a PCMCIA Cards, Cardbus Cards, Compact Flash Cards, PCI or ISA add-in boards. The advent of high-speed networking and wireless communications means that there are many applications that could take advantage of this invention, benefiting from the simplicity and broad support of the 16550-type UART for low speed data traffic, whilst using the high-speed capability of the auxiliary parallel data channel for high-speed data traffic. Two specific applications are now described by way of example. These are both wireless applications, but it will be understood that the invention can be applied equally well to wired applications.

APPLICATION EXAMPLE 1

PCMCIA Wireless Card

Figure 9:
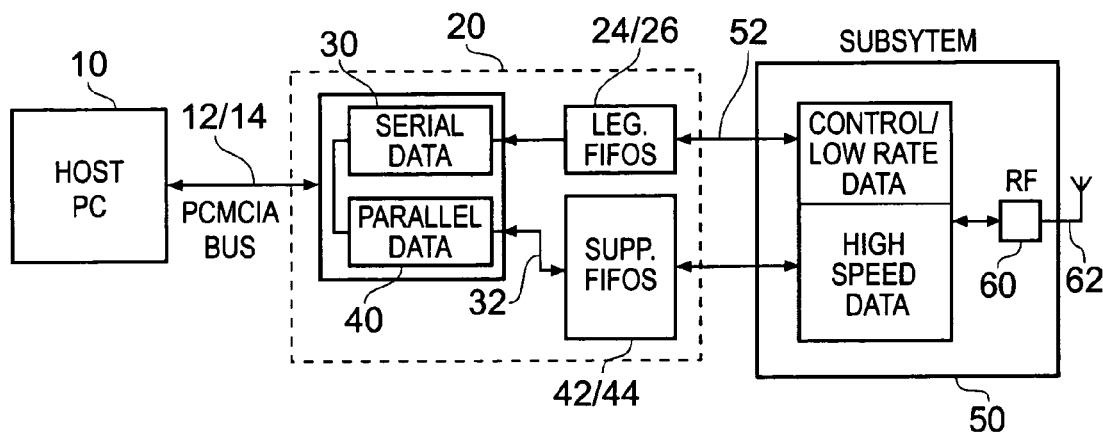
FIG. 9 is a block diagram of a first example application.

FIG. 9 shows an example application of a PCMCIA wireless card connected to a host PC 10. The wireless card contains both the modified UART 20 and the subsystem 50 and connects to a host PC 10 through a PCMCIA bus 12/14. The subsystem 50 includes a wireless RF transceiver 60 with aerial 62 to connect to a subscriber network offering voice and data services. The legacy serial channel 30 with FIFOs 24/26 and the additional parallel channel 40 with internal bus 32 and supplementary FIFOs 42/44 are shown, with the same reference numerals being used as for FIG. 2 for the corresponding components.

The subscriber network could be GSM, GPRS, CMDA etc as widely used throughout the world for mobile telephony. Data services for these networks are growing in popularity to deliver additional "content" such as web pages, directory services, mapping data etc. As the bandwidth of these data services increases it becomes impractical to send the data over the conventional serial data channel as this becomes a bottleneck. Such an application could benefit from the proposed scheme of providing an auxiliary parallel data channel, using supplementary FIFOs or other data buffers, in combination with the conventional serial channel. The system designer could partition the data flows from his "modem" chipset to enable the low rate "command and control plus voice" data to flow via the standard serial connection. Meanwhile, the higher rate data would be sent separately to the connected read and write supplementary FIFOs. This data might be Internet pages, digital images, digital audio data, network traffic etc. In some applications, only a single FIFO (or other data buffer) for read operations may be necessary when the predominant data bandwidth is towards the user, i.e. into the host computer. In this case, the limited bandwidth needed in the opposite direction can be handled by the serial communications channel. Other applications might make the opposite solution attractive, namely provision of only a single FIFO for write operations. The reverse link in such applications is normally much lower rate i.e. the data rates are asymmetric. The supplementary FIFOs provide the means of streaming this high-speed data to and from the host without interfering with the serial operations. The high-speed data would be handled by an adapted device driver and passed to other application software for further processing. It may also be possible to use a reconfigurable supplementary data buffer that can be configured either for read or write operations as desired. It will be understood that these comments also apply to other examples and embodiments of the invention.

The PCMCIA wireless data card would present itself to the host computer system as a regular 16550 serial UART device and could take its configuration and set-up commands over the serial channel. It could also pass its internal status information back to the host on this serial channel.

The utilization of the invention in this example thus allows a simple and well-proven way to initialize and monitor the subsystem, allowing fast development times and correspondingly a faster time-to-market for such a product.

APPLICATION EXAMPLE 2

Compact Flash Card for Streaming Wireless Data to a PDA

Figure 10:
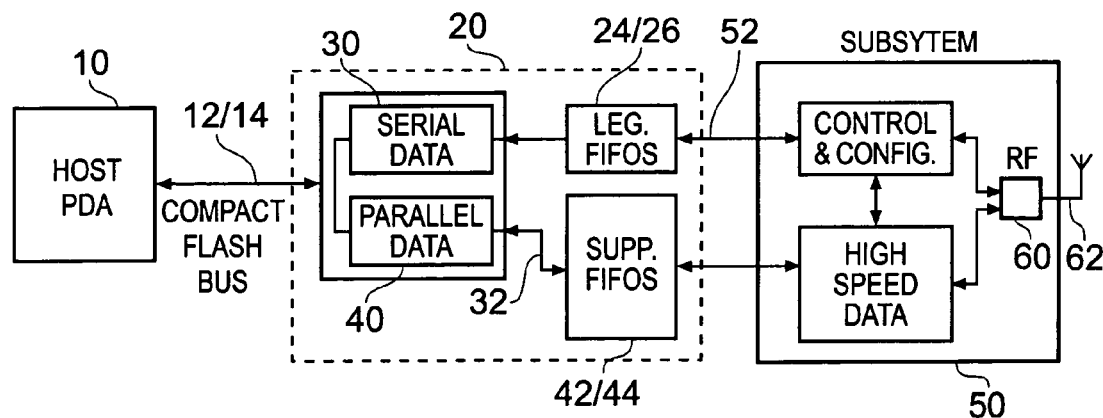
FIG. 10 is a block diagram of a second example application.

FIG. 10 shows an example application in which a compact flash card is used to receive a proprietary wireless (or wired) data service. The compact flash card incorporates both the modified UART 20 and subsystem 50. The subsystem 50 has a wireless RF transceiver 60 with aerial 62 for communicating with the wireless data service. The subsystem 50 includes hardware for separating the parallel and serial channels in order to communicate with the auxiliary parallel and legacy serial channels 30 and 40 of the modified UART 20 respectively. The auxiliary parallel data channel uses supplementary FIFOs 42/44 and internal bus 32 to stream high rate data to the host PDA 10 over the compact flash bus 12/14. The data is transferred over a compact flash bus 12/14. The serial channel with the legacy FIFOs 24/26 is used to communicate with the card's internal decoder or microprocessor to allow it to be configured with operating parameters and to allow status data to be gathered.

Finally, it will be understood that the host in this example need not be a PDA, but could be a PC or other product.

REFERENCES

[1] U.S. Pat. No. 6,434,161
[2] U.S. Pat. No. 6,381,661
[3] U.S. Pat. No. 6,260,086
[4] U.S. Pat. No. 6,201,817
[5] U.S. Pat. No. 5,557,751

What is claimed is:

1. An interface device for enabling communications between a host and a subsystem, comprising:
   (a) a register set consisting of a plurality of standard UART registers, the register set being configurable to control host-subsystem communications;
   (b) a host interface configurable to establish data communication with the host;
   (c) a serial interface configurable to establish a bi-directional serial data communication channel to the subsystem under control of the register set; and
   (d) a parallel interface configurable to establish an auxiliary parallel data communication channel to the subsystem, the parallel data communication channel being operable in conjunction with the serial data communication channel, wherein the parallel interface operates under control of the register set.

2. An interface device according to claim 1, further comprising a supplementary data buffer for writing and/or reading data to and/or from the subsystem via the parallel interface.

3. An interface device according to claim 2, wherein one of the registers is mapped to the data buffer so that accesses to the mapped register will cause accesses to the data buffer.

4. An interface device according to claim 2, wherein the data buffer is a FIFO buffer.

5. An interface device according to claim 1, further comprising supplementary data buffers for writing and reading data to and from the subsystem via the parallel interface.

6. An interface device according to claim 5, wherein one of the registers is mapped to at least one of the supplementary data buffers so that accesses to the mapped register will cause accesses to the at least one of the supplementary data buffers.

7. An interface device according to claim 5, wherein the data buffers are FIFO buffers.

8. An interface device according to claim 5, further comprising first control and status lines connected between each data buffer and the register set to communicate control and status signals to and from each data buffer.

9. An interface device according to claim 8, further comprising second control and status lines connected between each data buffer and the parallel interface to communicate control and status signals to and from each data buffer.

10. An interface device according to claim 1, wherein the UART standard is the 16550 standard.

11. A card comprising an interface device according to claim 1 integrated with the subsystem.

12. A card according to claim 11, wherein the subsystem includes a wireless interface for communicating with a third party data transceiver.

13. A system comprising a host, a subsystem and an interface device according to claim 1 connected between the host and subsystem.

14. A system according to claim 13, wherein the serial data communication channel and the auxiliary parallel data communication channel include wireless portions.

15. A system according to claim 13, wherein the serial data communication channel and the auxiliary parallel data communication channel are made exclusively of fixed links.

16. An interface device for enabling communications between a host and a subsystem, comprising:
   (a) a register set comprising of a plurality of registers, wherein each of the plurality of registers is a standard UART register and wherein the register set is configurable to control host-subsystem communications;
   (b) a host interface configurable to establish data communication with the host;
   (c) a serial interface configurable to establish a bi-directional serial data communication channel to the subsystem under control of the register set; and
   (d) a parallel interface configurable to establish an auxiliary parallel data communication channel to the subsystem, the parallel data communication channel being operable concurrently with the serial data communication channel, wherein the parallel interface operates under control of the register set.

17. A method of communicating data between a host and a subsystem, comprising:
   (a) establishing a bi-directional serial data communication link with the subsystem under control of a register set, the register set comprising a plurality of registers wherein each of the plurality of registers is a standard UART register;
   (b) establishing an auxiliary parallel data communication link with the subsystem also under control of the register set, the auxiliary parallel data communication link being operable concurrently with the serial data communication link; and
   (c) transferring data over the auxiliary parallel data communication link to bypass the serial data communication link.

* * * * *